March 18, 1924.
V. C. BLACKMAN
MULTIPLE DRILL
Filed March 30, 1920
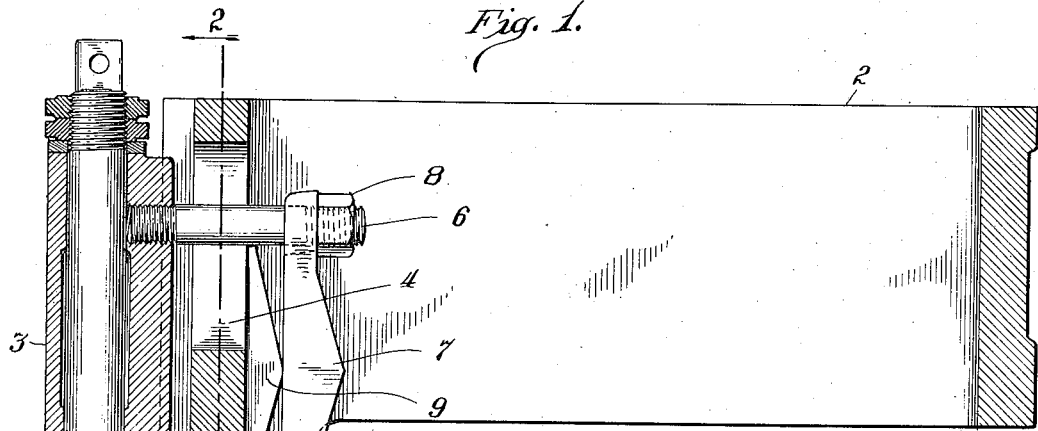
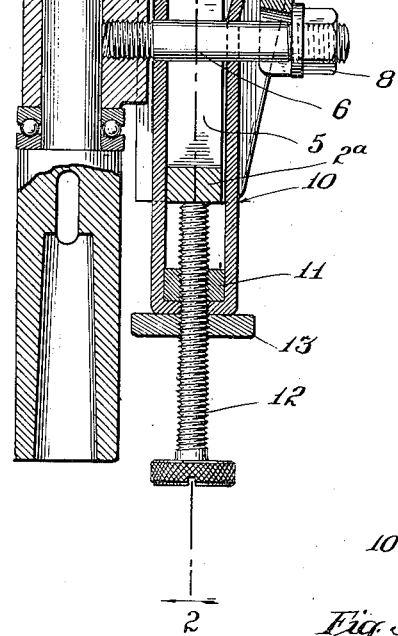
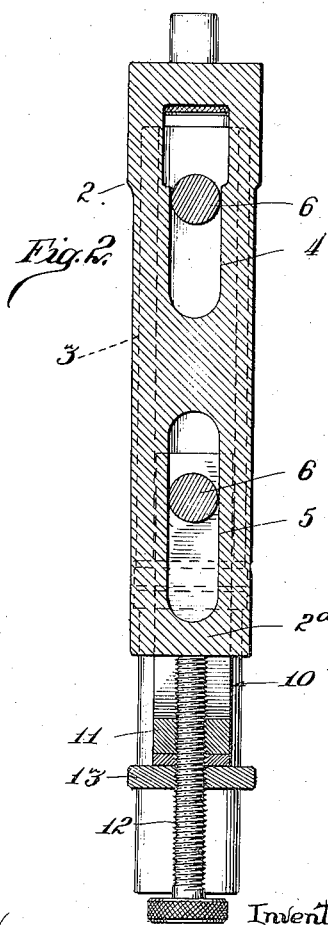

Patented Mar. 18, 1924.

1,487,195

UNITED STATES PATENT OFFICE.

VERE C. BLACKMAN, OF FOND DU LAC, WISCONSIN, ASSIGNOR TO THE NATIONAL AUTOMATIC TOOL CO., OF RICHMOND, INDIANA, A CORPORATION OF INDIANA.

MULTIPLE DRILL.

Application filed March 30, 1920. Serial No. 369,944.

*To all whom it may concern:*

Be it known that I, VERE C. BLACKMAN, a citizen of the United States, residing at Fond du Lac, in the county of Fond du Lac and State of Wisconsin, have invented certain new and useful Improvements in Multiple Drills, of which the following is a specification.

The object of the present invention is to provide an equipment whereby definitely regulated adjustment may be had and absolutely maintained for special kinds of work such as the so-called "spot facing," counterboring or drilling to an accurate depth. Multiple drill work of this character requires the setting of different drills at differing heights and while provisions have heretofore been made in these machines for vertical adjustment of the spindle bearings, the exactions of certain classes of work have not been fully met, either with respect to attainment of the fine adjustment called for in any definitely regulated manner or in respect of the absolute maintenance of the adjustment during the performance of the work, with the result that extreme accuracy has not been insured. The prior patent of Edgar W. Cleveland, No. 1,082,009, issued December 23, 1913, shows an adjustable arm for multiple spindle drills which has been very extensively used and is thoroughly efficient as far as it goes. My assignee has practiced the Cleveland invention for a number of years, both in the form shown in said patent and with certain changes and additions in the way of mechanical betterment in carrying out the identical principle there disclosed and has found it thoroughly efficient for many classes of work, but certain exacting requirements of other and more modern classes of work have been encountered which are not fully satisfied by the Cleveland invention as shown in said patent or as heretofore developed. In carrying out my present invention I retain all of the advantages of the Cleveland invention,—in fact I have drafted my invention upon that of Cleveland and certain combinational results follow which in practice have been found to fully satisfy the exacting requirements above referred to.

In the drawings which accompany and form part of this specification, Fig. 1 represents in vertical longitudinal section an arm of a multiple drill with the present invention applied thereto; Fig. 2 is a cross-section taken on the line 2—2 of Fig. 1, and Fig. 3 shows in perspective the attachment of the present invention.

The numeral 2 designates the arm of the multiple drill which arm is of the usual hollow form and has a groove formation on its face to receive the tongue of the spindle bearing 3. There are the usual slots 4 and 5 in the cross web of the arm casting, through which slots extend the bolts 6 that carry said bearing. The numeral 7 designates the steel clamp bar which straddles said bolts behind their nuts 8 and which rocks upon the steel fulcrum piece 9. The construction thus far described provides for the usual vertical adjustment of the spindle and the clamping of its bearing in poition upon the face of the arm.

Now in carrying out my invention I suspend from the lower bolt 6 a looped strap 10, the arms of which are provided with aligned openings through which the bolt loosely extends and the bottom of which goes under the cross-bar 2ª at the lower end of the depending portion of the head of the arm 2. A square nut 11 is seated and secured in the bottom of the loop, as by sweating it in, or the bottom part of the loop may be integral with the arm in thickened dimension so as to itself supply the element of a nut. The nut is finely tapped and a fine adjusting screw 12 engages it, entering from the lower side of the loop and presenting its upper end for engagement with the aforesaid cross-bar 2ª. A lock nut 13 is placed upon the adjusting screw 12 so as to screw against the bottom of the loop.

It will be seen that the above described attachment provides for regulating to a nicety the exact height at which the spindle is set. Of course it will be understood that the lower clamping nut 8 is released when the spindle bearing is being adjusted and when the adjustment has been made is tightened so as to clamp the bearing against the face of the arm. By manipulating the fine adjusting screw 12 and then setting the lock nut 13, the determined height at which the tool carried by the spindle is to stand may be fixed with precision through the engagement of the upper end of said screw with the cross-bar 2ª of the arm so that when the loosened clamping nut 8 is tightened there will be every assurance that the spindle bearing is being clamped at exactly the right position on the arm. Furthermore, this engagement of the lock adjusting screw with said arm-cross-bar supplements the clamp above in the matter of resisting displacement of the spindle bearing. Thus it will be seen that said engagement supplies a positive lock against slippage of the clamped spindle bearing in an upward direction when the tool is feeding down against the resistance of the material being operated upon.

In a typical use the drill head is lowered with the spindle bearing clamp released until the tool reaches a position corresponding with the depth of recess to be formed, and then the clamp is tightened, and the screw is brought to bear against the underside of the arm and the lock nut is turned home. Thus the position of the spindle bearing is securely fixed against upward thrust effects. A trial operation is performed and any further fine adjustment that may be needed is accomplished by slightly releasing the clamp, backing off the lock nut and manipulating the fine thread screw.

I claim:

1. In spindle supporting apparatus, the combination with an arm, a spindle bearing slidably fitting the end face of the arm, and means for clamping the bearing against the arm; of a vertical adjusting screw located at the inner side of the bearing in the general plane of the same and the arm and engaging a depending portion of the latter and being manipulatable from below, said screw being coactively related to the bearing whereby to assist the clamp in holding the tool to its work besides providing for a fine vertical adjustment of the bearing to the work in hand.

2. In spindle supporting apparatus, the combination with a hollow arm having a downwardly extended head, a holder movably mounted on the latter, and a clamp; of a loop hung from the holder and embracing a portion of the extended part of the head, and an adjusting screw extending through the underlying part of the loop and engaging the said portion of the head.

3. In spindle supporting apparatus, the combination with a hollow arm having a downwardly extended head, a holder movably mounted on the latter, and a clamp comprising bolts, cross-piece and nuts; of a loop hung from the lower bolt and embracing a portion of the extended part of the head, and an adjusting screw extending through the underlying part of the loop and engaging the said portion of the head.

4. In spindle supporting apparatus, the combination with a hollow arm having a downwardly extended head, a holder movably mounted on the latter, and a clamp; of a loop hung from the holder and embracing a portion of the extended part of the head, a nut fixed in the bottom of the loop, and an adjusting screw extending through said nut and engaging the said portion of the head.

VERE C. BLACKMAN.